(12) United States Patent
Elwick

(10) Patent No.: US 6,401,865 B1
(45) Date of Patent: Jun. 11, 2002

(54) SAWHORSE RAIL WITH ADJUSTABLE WORKPIECE SUPPORT

(76) Inventor: Gary K. Elwick, 105 Royal Dr., Collinsville, IL (US) 62234

( * ) Notice: Subject to any disclaimer, the term of this patent is extended or adjusted under 35 U.S.C. 154(b) by 0 days.

(21) Appl. No.: 09/799,276

(22) Filed: Mar. 5, 2001

Related U.S. Application Data

(60) Provisional application No. 60/196,583, filed on Apr. 13, 2000.

(51) Int. Cl.[7] .............................. E04G 1/00; E04G 1/34
(52) U.S. Cl. ..................................... 182/182.1; 182/153
(58) Field of Search ........................ 182/182.1, 182.2, 182/153, 155, 224, 225, 181.1

(56) References Cited

U.S. PATENT DOCUMENTS

| | | | |
|---|---|---|---|
| 140,858 A | * | 7/1873 | Tilley ....................... 182/182.1 |
| 145,174 A | * | 12/1873 | Harden .................... 182/153 X |
| 226,431 A | | 4/1880 | Warner |
| 386,218 A | | 7/1888 | Phillips |
| 2,297,316 A | * | 9/1942 | Padgett ..................... 182/182.1 |
| 2,637,358 A | | 5/1953 | Larson |
| 3,734,235 A | | 5/1973 | Lanier |
| 3,843,110 A | | 10/1974 | Smith |
| 4,062,423 A | | 12/1977 | Armbruster |
| 4,260,040 A | | 4/1981 | Kieffer |
| 4,375,245 A | * | 3/1983 | Schill ......................... 182/155 |
| 4,570,915 A | | 2/1986 | O'Hern |
| 4,727,960 A | * | 3/1988 | Chaffee et al. ......... 182/224 X |
| 4,782,917 A | * | 11/1988 | Schulz ................... 182/225 X |
| 5,865,269 A | * | 2/1999 | Eskesen ................... 182/182.2 |
| 5,904,225 A | | 5/1999 | Patros |

* cited by examiner

*Primary Examiner*—Daniel P. Stodola
*Assistant Examiner*—Hugh B. Thompson
(74) *Attorney, Agent, or Firm*—Polster, Lieder, Woodruff & Lucchesi, LC

(57) ABSTRACT

A sawhorse with the horizontal rail having an inner chamber housing a plurality of linearly aligned, upwardly projecting work support elements above a laterally moveable skid. The skid has a plurality of linearly aligned upwardly projecting ramps. The ramps elevate the work support members above the rail for supporting workpieces above the rail when the skid is moved in one direction and allow the work support elements to retract into the chamber when the skid is moved in the opposite direction.

17 Claims, 4 Drawing Sheets

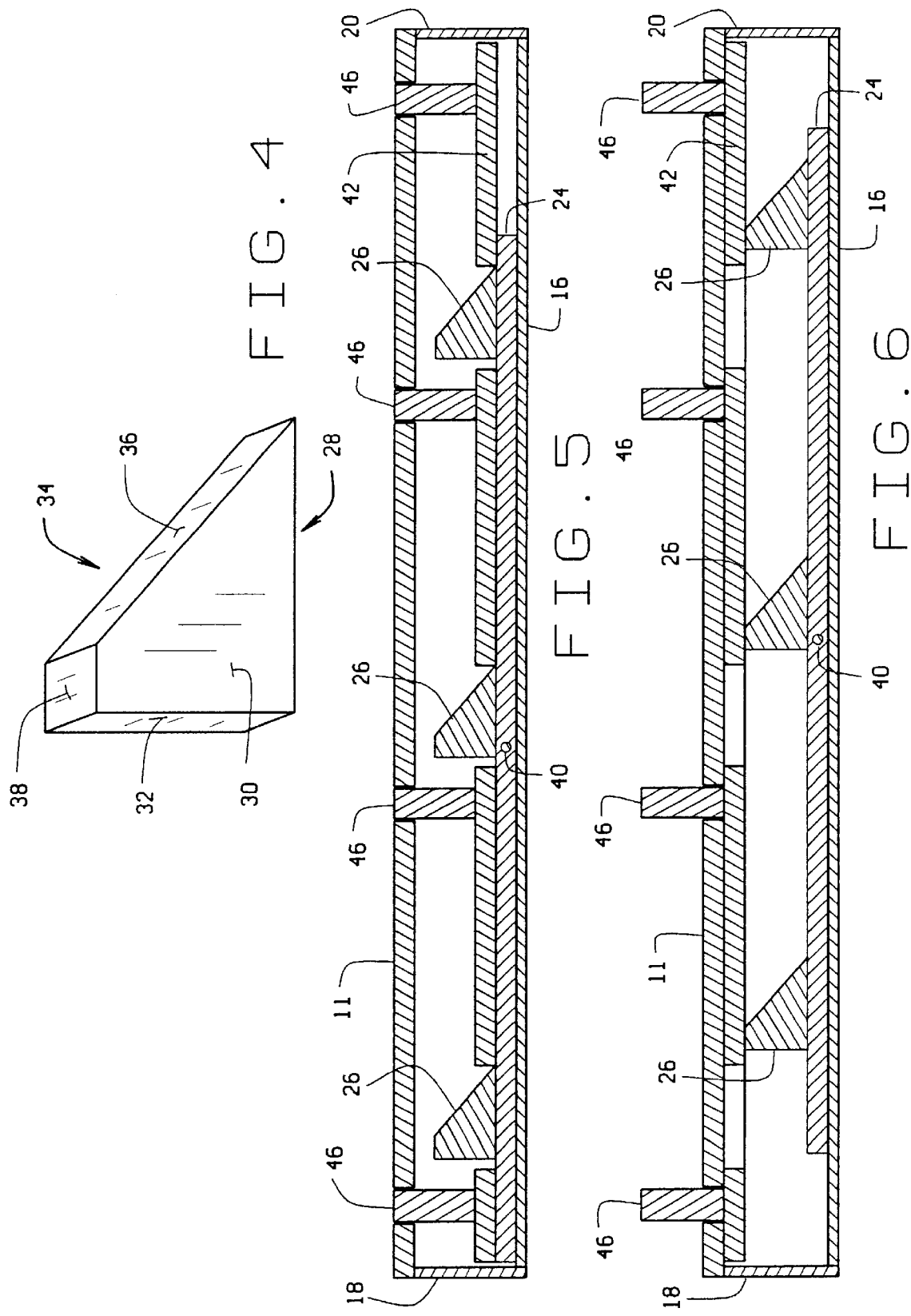

SAWHORSE RAIL WITH ADJUSTABLE WORKPIECE SUPPORT

CROSS-REFERENCE TO RELATED APPLICATIONS

This application claims priority to provisional application Serial No. 60/196,583, filed Apr. 13, 2000.

STATEMENT REGARDING FEDERALLY SPONSORED RESEARCH OR DEVELOPMENT

Not Applicable.

BACKGROUND OF THE INVENTION

The present invention relates to an apparatus for supporting workpieces on a sawhorse, and more particularly, to an apparatus for alternatively supporting workpieces directly atop a sawhorse beam or supporting workpieces above the sawhorse beam on a series of adjustable pegs to provide operational clearance for tools between the workpieces and the beam.

"Sawhorse" is a generic name for a device that generally consists of a horizontal beam or rail supported by two pairs of opposed legs that descend from the rail, generally at an angle away from each other, to provide stability to the rail. While most sawhorses stand about 30 to 36 inches tall, some collapse or fold by various means for easier storage and transportation.

Sawhorses are used by carpenters, tradesmen and others, to support objects, workpieces and materials, such as boards and plywood, (collectively "workpieces") during construction-type operations. These types of operations cover a broad range of activities, including sanding, buffing, cutting, drilling, nailing and gluing. Many of the operations are accomplished using motorized "power" tools, such as circular saws, jig saws and power drills. During operation, many tools, and in particular power tools, must penetrate below the bottom surface of the workpiece. That is, to cut a board in half, for example, a portion of the blade on a circular saw actually extends below the bottom surface of the board. Similarly, to drill a hole through a plank, the drill tip must fully penetrate through the bottom surface of the plank.

Such penetration can cause difficulties when, for example, the cutting or drilling traverses the area of the workpiece that is resting directly on the rail of the sawhorse. In order to prevent damage to the workpiece, the sawhorse or the tools, the workpiece must be repositioned on the support surface during the operation. In fact, the workpiece must often be repositioned multiple times to complete a single operation. For example, when ripping a four foot by eight foot sheet of plywood with a circular saw, the plywood sheet may be repositioned several times to avoid cutting the rail of the sawhorse. This imparts inefficiencies in all such operations and may cause the user to take unnecessary risks to the equipment, the sawhorse or himself in order shorten the time required to perform each such operation.

Accordingly, it would be desirable to have a sawhorse design that allows operations to be performed on a workpiece supported by the sawhorse without risking damage to the workpiece or the sawhorse, and without requiring time consuming steps to reposition of the workpiece.

SUMMARY OF THE INVENTION

The present invention resides in a sawhorse rail design that elevates the supported workpiece above the surface of the rail itself, such that operations that would otherwise require repositioning the workpiece atop the sawhorse to avoid encountering the rail can be performed without such repositioning. This improvement allows the carpenter or other craftsman to utilize the sawhorse more efficiently without the concern that an operation may unintentionally cause damage to the rail, the tools or the workpiece.

Generally stated, the invention includes a novel rail. The rail has a top surface which include plurality of linearly aligned holes along its length, two horizontally extending side walls and two end walls which define an inner cavity. Within the cavity is a series of interconnected, linearly aligned, upwardly protruding support members operatively associated with an apparatus for urging the support members through the openings in the top surface of the rail to create a workpiece support surface above the rail. Hence, the support members are adjustable from a first position above the top of the rail to a second position below the top of the rail.

The support members rest atop a plank which rests on a skid slidably positioned within the cavity. The plank is free to move vertically, but not laterally. The plank has a series of slots formed in its length which correspond to a series of ramps positioned on the skid below the plank. The skid can move laterally. The relationship between the slots and the ramps is such that by moving the skid in one lateral direction, one side of each of the slots is forced to ride up the incline of its corresponding ramp, thereby raising the plank carrying the support members to a position where the support elements protrude through the openings in the top wall of the rail. When the skid is moved in the other lateral direction, the slots slide down the incline on the ramps, thereby lowering the plank and the support members. The tops of the ramps are flat to allow the plank to rest atop the ramps and maintain the support members in the first position above the rail. A handle, attached to the skid through a slot formed in one of the sides of the rail, enables the user to impart the desired lateral movement to skid so as to raise or lower the support members.

Hence, the present invention provides a simple to control mechanism that allows the user to selectively and quickly raise or lower the workpiece atop the sawhorse rail depending on the operation being performed on that workpiece.

In addition, the rail in the present invention is designed to reside atop both fixed and collapsible legs or supports. The present invention is readily adaptable to numerous shapes and sizes, and may be constructed of many materials, such as wood, plastics and metals.

Other objects and additional features of the present invention will be in part apparent and in part pointed out hereinafter.

BRIEF DESCRIPTION OF THE DRAWINGS

FIG. 4 is a perspective view of one of the ramp elements of the sawhorse rail;

FIG. 5 is a cross-sectional side elevation of the sawhorse rail, showing the support members in the lowered position within the body of the rail;

FIG. 6 is a cross-sectional side elevation of the preferred embodiment, showing the support pegs in the fully raised position above the body of the rail;

Corresponding reference characters indicate corresponding parts throughout the several views of the drawings.

DESCRIPTION OF THE PREFERRED EMBODIMENT

Figure 1:
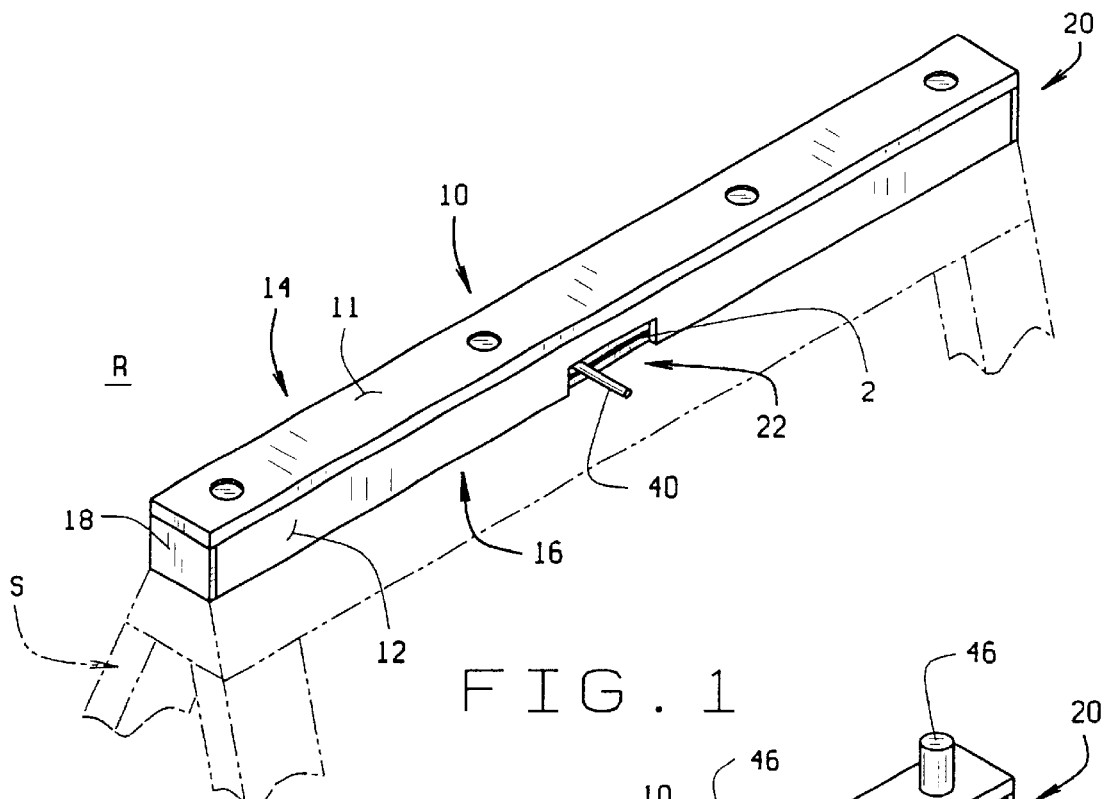
FIG. 1 is a perspective view of the preferred embodiment of the novel sawhorse rail atop a sawhorse, shown in phantom, with the support members in the lowered position within the body of the rail.
Figure 2:
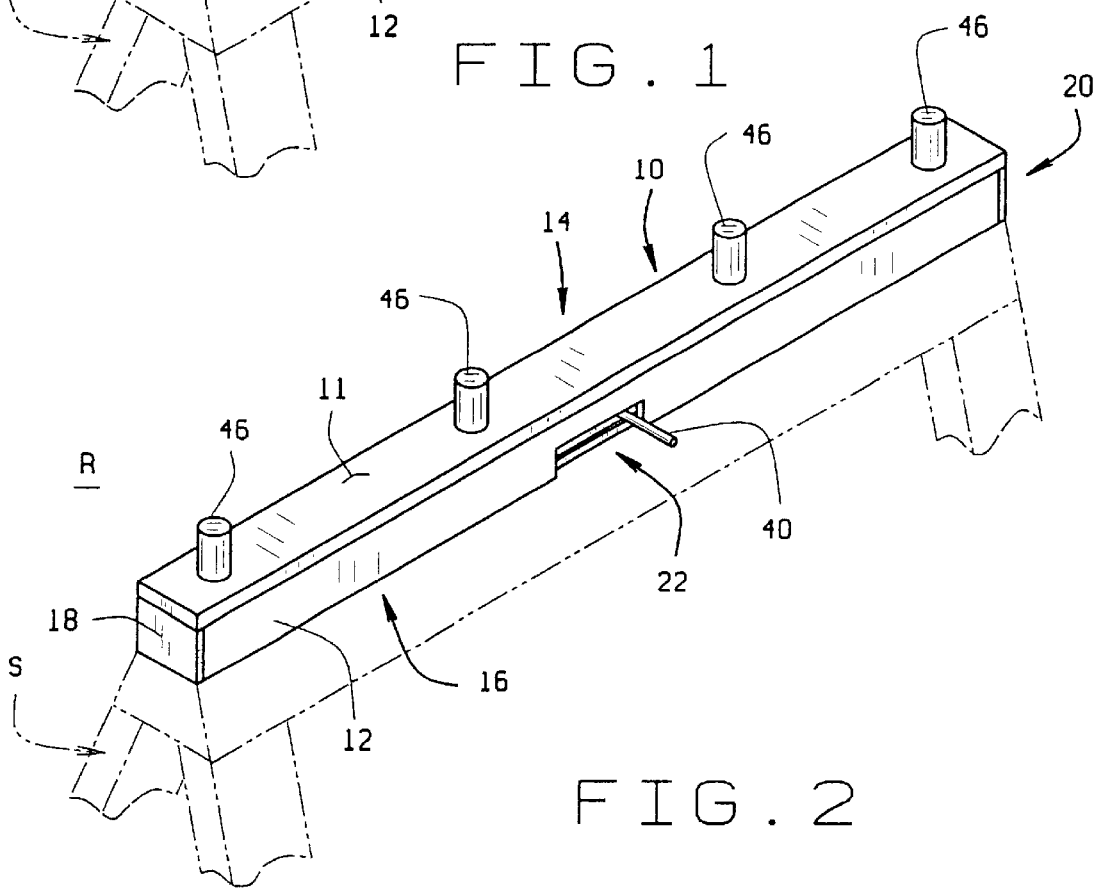
FIG. 2 is a perspective view of the embodiment of FIG. 1, with the support members in the fully raised position above the surface of the rail.

The preferred embodiment of the novel sawhorse rail is indicated generally at 10 (FIGS. 1 and 2). The rail 10 may be used independently or it may be fastened to a set of sawhorse legs, as depicted in ghost images in FIGS. 1 and 2, by any of a number of common and well-understood means, such as bolts or screws between the rail 10 and the legs, a clamping device, or glues such as epoxy. Alternatively, the rail 10 may be simply placed atop a set of legs without firm attachment.

The sawhorse rail 10 includes a top wall 11, a first vertical side wall 12, a second vertical side wall 14, a base 16, and a first vertical end wall 18 and second vertical end wall 20. When fully assembled, the body of the rail 10 is hollow, i.e. having an inner cavity defined by the recited walls and base. Near the center of the lower edge of the side wall 12 is a horizontal notch 22.

Figure 3:
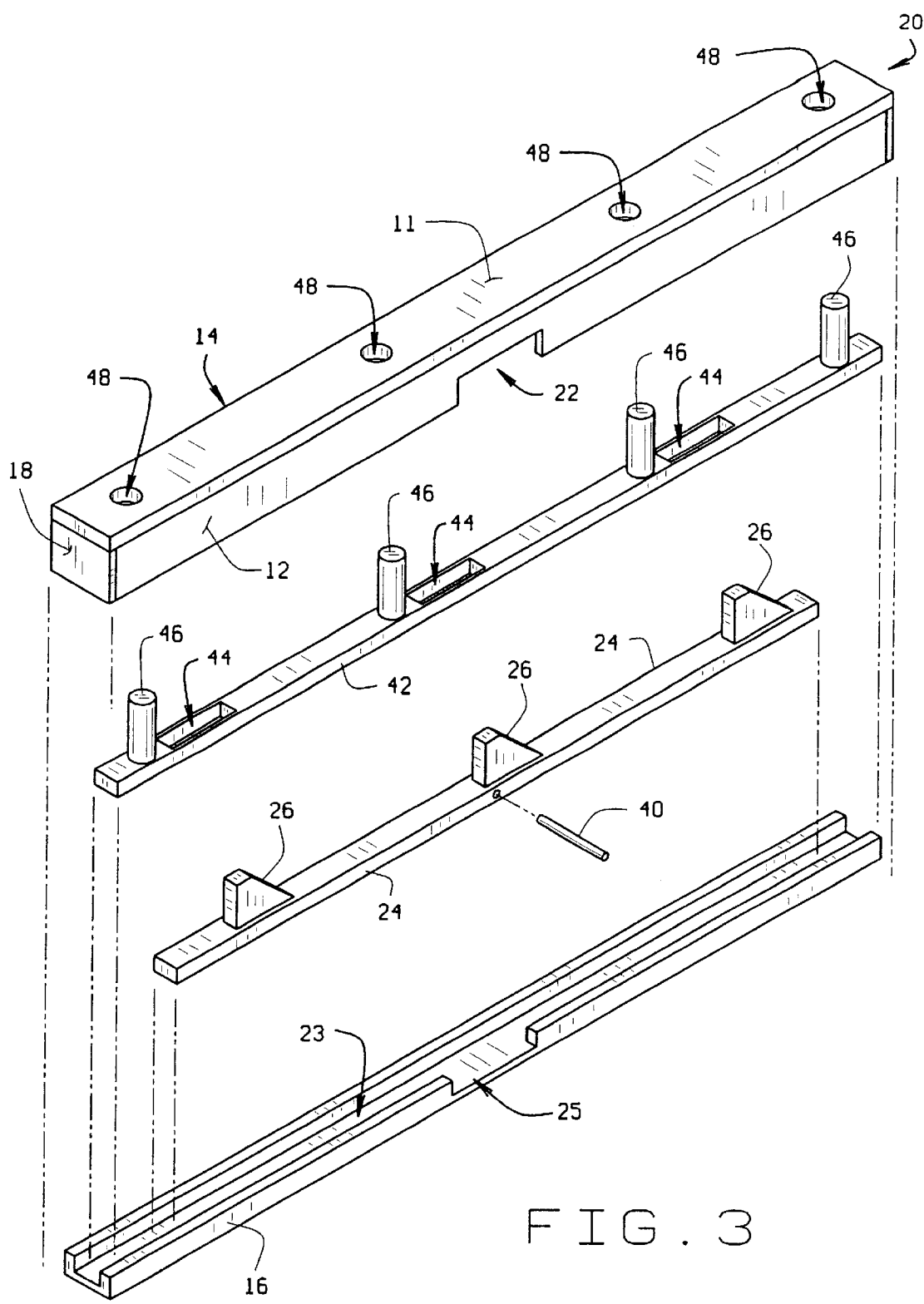
FIG. 3 is an exploded view of the embodiment of FIG. 1.

Referring to FIG. 3, it can be seen that a track 23 is formed in, and runs the full horizontal length of the centerline of the top surface of the base 16. A horizontal notch 25 is formed in the side of the track 23 that aligns in registry with the notch 22 in the side wall 12 to form a handle opening along the side of the rail 10. A slidable skid 24 rests in the track 23. The skid 24 is slightly thinner than the width of the track 23, and somewhat shorter than the base 16. This allows the skid 24 to slide freely within the track 23, between the end walls 18 and 20 within the body of the rail 10 as will be explained below.

A series of linearly aligned, equally shaped ramps 26 are fixedly attached to the top surface of the skid 24. Each of the ramps 26 (FIG. 4) has a rectangular base 28 with three vertical walls 30, 32 and 34, an incline 36, and a short, flat, horizontal platform 38 at the top of the incline 36. The ramps 26 are equidistant apart from one another along the skid 24, and oriented such that each incline 36 ascends from the skid 24 in the same angular direction. A handle 40 is also fixedly attached to the skid 24. The handle 40 is positioned along one side of the skid 24 such that the handle corresponds with and extends horizontally through the opening formed by the notches 22 and 25 in the side of the rail.

A plank 42 rests atop the skid 24 inside the body of the rail 10. The plank 42 is generally the same width, but is longer than the skid 24, such that the ends of the plank 42 nearly abut the inner surfaces of the end walls 18 and 20. The plank 42 has a series of linearly aligned rectangular openings 44 between each end. The number of the openings 44 is the same as the number of the ramps 26 on the skid below. Each of the openings 44 locates directly over one of the ramps 26 when the skid 24 is close to or abuts the inner surface of the first end wall 18. Because the openings 44 are slightly longer and wider than the base 28 of the ramps 26, the openings 44 can readily slide up and down over the ramps 26.

A set of equally dimensioned upwardly extending support members, shown as pegs 46, are attached in a along the top of the plank 42. The pegs 46 are positioned on the plank 42 to align with corresponding circular holes 48 in the top wall 11 of the rail 10. The holes 48 are slightly larger in diameter than the pegs 46, such that the pegs 46 may move freely up and down within the holes 48. It will be appreciated that pegs 46 could have a rectangular or other cross section if desired, provided the holes 48 have a complimentary shape. The height of the pegs 46 is slightly less than the distance from the top of the plank 42 to the top of the holes 48 (FIG. 5).

It is evident to one skilled in the art that when the skid 24 is resting at a first position adjacent the first end wall 18, the ramps 26 will fit fully inside the openings 44 in the plank 42. In this alignment, the plank 42 rests atop the skid 24, and the tops of the pegs 46 are lower than the tops of the holes 48. When the handle 40 is pushed toward the second end wall 20 (FIG. 6), the skid 24 and the ramps 26 travel in the same direction toward end wall 20. Because the plank 42 is constrained from lateral movement by the end walls 18 and 20, the ramps 26 are forced to slide under the edges of the openings 44 adjacent the bottom of the inclines 36. The force of the ramps 26 wedging under the edges of the openings 44 causes the plank 42 to ascend in a level fashion up along the inclines 36. This, in turn, raises the pegs 46 on the plank 42 through the holes 48. As the handle 40 moves further toward the second end 20, the pegs 46 will continue to ascend through the holes 48 until the inclines 36 are entirely under the plank 42. At this point, the plank 42 will then slide across, rest upon, the platforms 38 atop the ramps 26, and the pegs 46 will be fully extended above the surface of top wall 11 of the rail 10. Two or more of the tops of the pegs 46, in cooperation with one another, thereby form an elevated support surface for workpieces atop the sawhorse.

When the handle 40 is then actuated in the opposite direction, i.e. toward the first end wall 18 (FIG. 7), the skid 24 and the ramps 26 travel in the same direction. As before, the plank 42 is still constrained from lateral travel by the ends 18 and 20. Now, however, the ramps 26 slide along the platforms 38 under the plank 42 until the platforms 38 are fully within the openings 44. Thereafter, the plank 42 begins to descend as the ramps 26 slide back into the openings 44 along the inclines 36. This causes the pegs 46 to simultaneously descend through the holes 48. As the handle 40 moves further toward the first end 18, the pegs 46 will continue to descend through the holes 48 until the ramps 26 are entirely within the openings 44 and the plank 42 is again resting atop the skid 24. At this point, the tops of the pegs 46 will be below the top of the holes 48 in top wall 11 of the rail 10.

Figure 7:
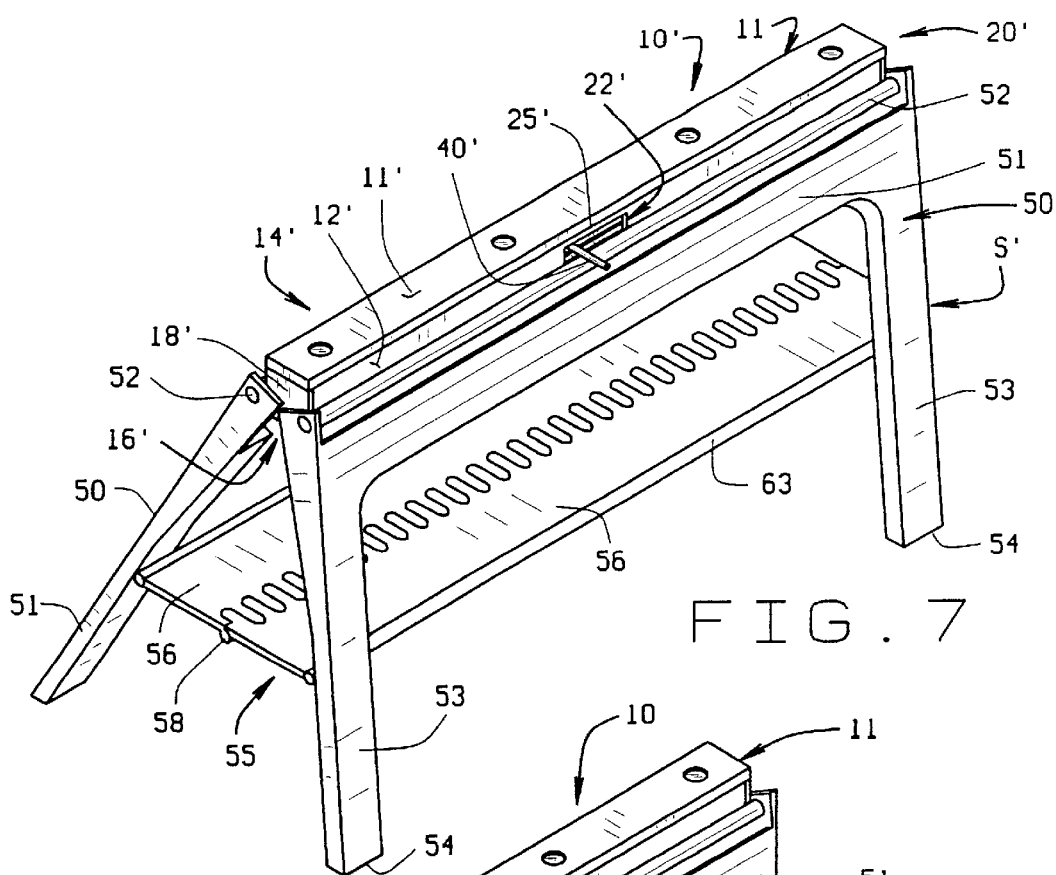
FIG. 7 is a perspective view of the sawhorse rail attached to a pair of folding leg braces with a folding shelf below the rail, showing the legs fully open and the shelf locked flat.
Figure 8:
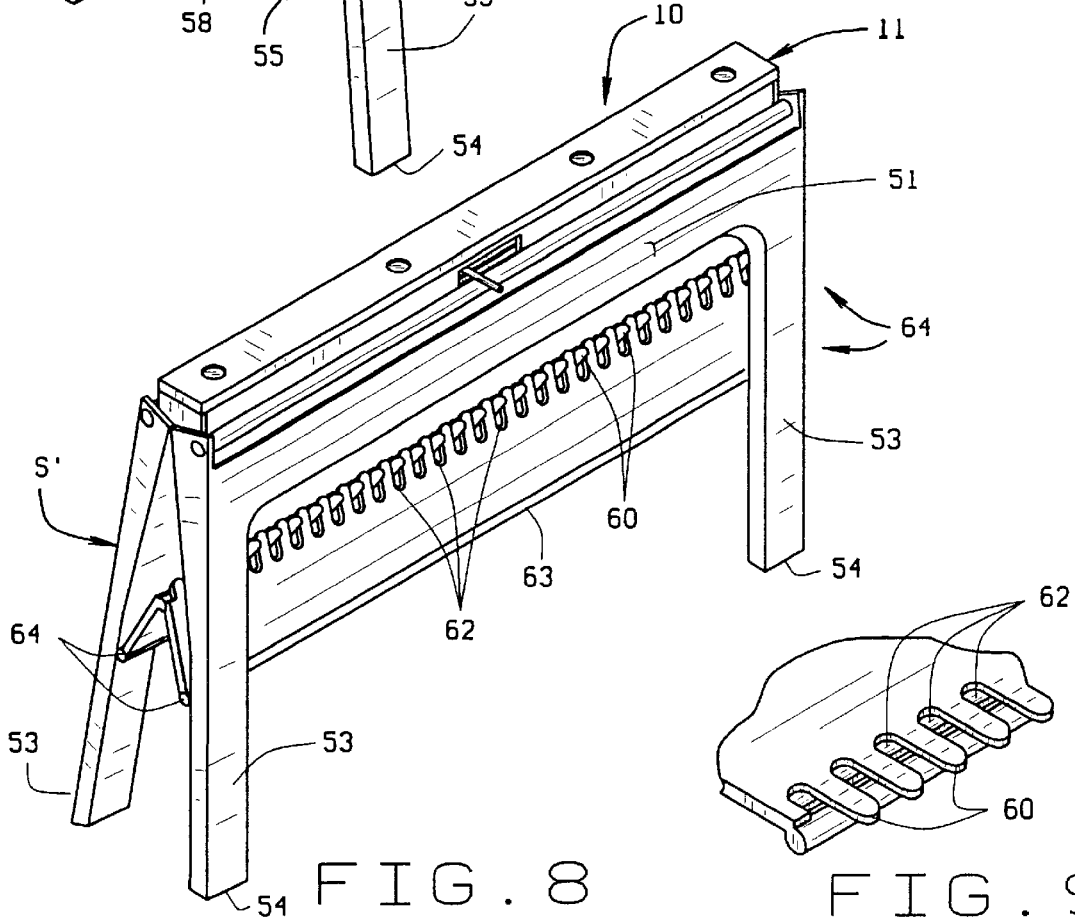
FIG. 8 is a perspective view of the embodiment of FIG. 7, showing the legs closed together and the shelf folded up between the legs.

FIGS. 7 and 8 show another embodiment of the present invention in which a rail 10', having a top wall 11', side walls 12' and 14', a base 16', and end walls 18' and 20', is mounted on a collapsible sawhorse S'. In this embodiment, two equally shaped leg braces 50 are pivotally attached along their tops to the side walls 12' and 14' of the rail 10' by a pair of hinges 52. Each of the leg braces 50 is a flat plate having a generally rectangular top portion 51 with two broad, flat-bottomed legs 53 at the opposite end. The bases 54 of both legs 53 on each leg brace 50 are parallel to one another. The leg braces 50 can fold in towards one another along the side walls 12' and 14', as in FIG. 8. The hinges 52 are both horizontal, parallel to one another, and located at the same height above the bottom of the rail 10'. In order to accommodate the hinge 52, notches 22' and 25', are in a higher position along side 12' than the notches 22 and 25 along the side 12 in the preferred embodiment. This requires that handle 40' attach along the skid 24' and descend vertically within the body of the rail 10' to attach to skid 24'.

Figure 9:
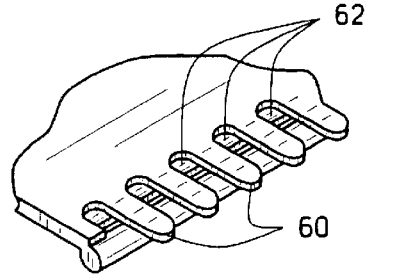
FIG. 9 is perspective view of one end of the folding shelf of the modified embodiment, showing the tabs and grooves at the center hinge.

A folding shelf 55 is positioned between the leg braces 50. The shelf 55 is formed from two generally rectangular plates 56 that are pivotally connected to one another along the center of the shelf 55 by a hinge 58. A series of interlocking tabs 60 extend from the centermost edges of the plates 56 above the hinge 58. The tabs 60 are shaped to lay flat in a series of complementary shaped grooves 62 (FIG. 9) on the opposed plate 56 when the plates are coplaner and the shelf 54 is flat. (FIG. 7). The tabs 60 therefore form a stop that prevents upward rotation of the plates 56 about the hinge 58 beyond the point where the plates 56 are coplaner.

Each long side 63 of the shelf 55 is parallel to the hinge 58 and pivotally attaches to each of the four legs 53 by hinges 64. The hinges 64 on each leg brace 50 are coaxial with one another and run horizontally along the inner sides of the legs 53. On each of the leg braces, the hinges 64 are both equidistant from the base of the legs 53.

Hence, when the leg braces 50 are closed together, as in FIG. 8, the shelf 55 is folded in half and extends vertically above the hinges 64 between the legs 53. When the leg braces 50 are pivotally opened away from one another about the hinges 52, the two plates 56 begin to rotate about the hinges 64 at their outer ends and simultaneously rotate about the hinge 58 at their center, causing the center of the shelf 55 to lower. As the center of the shelf 55 moves downward, the tabs 60 also move from a nearly vertical orientation toward a horizontal orientation. The leg braces 50 can continue to rotate open until the shelf 55 is fully horizontal. At that point, the tabs 60 lock into the grooves 62, the top of the shelf 55 is flat, and the structure of the shelf 55, being fully extended, prevents the leg braces 50 from opening further. The shelf 55 has a width such that when the leg braces 50 are fully opened, the distance between the legs 53 are far enough apart to provide ample stability while maintaining a suitable working height for the crown 11 of the sawhorse.

The present invention, therefore, enables the user to easily, controllably, and rapidly raise a workpiece supported by the rail 10 above the top of the top surface rail 10. This enables the user to perform various operations on the workpiece without repositioning. By simply sliding the handle 40 in one direction, the workpiece can be raised above the rail 10 on the pegs 46. By simply returning the handle 40 to its original position, the workpiece will be lowered back onto the top wall 11 of the rail 10. The rail 10 can be located on virtually any solid work surface, such as the on the ground, a tabletop, a bench, a chair, etc., or the rail 10 can be configured atop a sawhorse. Thus, the present invention greatly reduces the risk of damage to the work surface or the sawhorse, and the tools, and virtually eliminates the need to reposition workpieces on the rail 10 to avoid contact between the rail 10, the work surface or the sawhorse, and various tools during operation. Additionally, embodiments of the present invention may also include collapsible or telescoping legs that enable ready storage and transport of the rail 10, and rapid set-up to a sawhorse.

Other variations on the basic apparatus are also available. For example, the base 16 could be formed without the track 23 such that the skid 24 simply rests atop the base 16 within the body of the rail 10. The handle 40 could be located at any position along either of the sides 12 or 14 of the rail 10, or extend out from either of the ends 18 or 20, where the handle would be pushed and pulled. The number of the ramps 26 and the openings 44 can vary from one to many. Similarly, the number of the pegs 46, and the holes 48 can be varied from one to many. Bearing, bushings and other friction reducing devices can be placed at various locations throughout the apparatus, such as between the skid 24 and the base 16, between the skid 24 and the plank 42, and in the openings 44 and 48, to enhance the functioning of the apparatus without deviating from the scope of the invention. Further, the sides of the openings 44 nearest the bottom of each incline 36 can be rounded, angled, or otherwise shaped to further enhance the sliding capability of the ramps 26 within the openings 44. Similarly, bearings or bushings can be incorporated along the same side of the openings 44.

In addition, the dimensions of the apparatus can vary significantly, including, but not limited to, widening or thinning the crown 11, the ramps 26, the skid 24, the plank 42 and the base 16. The ramps 26 can be exchanged with one or more other components that will enable the plank 42, and the pegs 46 or other similar supports, to rise within the rail 10 by moving the handle 40. The angle of the inclines 36 for the ramps 26 can be varied to virtually any angle less than 90 degrees, and can be oriented toward either the end 18 or the end 20. The inclines 36 on the ramps 26 can be concave or convex. The shape of the pegs 46 and their associated holes 48 can be varied to virtually any cross-sectional shape. A locking mechanism or device can be employed to lock the skid 24 into one or more desired positions. Finally, each of the components of the invention can be manufactured from a variety of materials, including, but not limited to, plastics, metals and woods, so long as the apparatus maintains the same functionality and the necessary structural integrity.

Springs or other devices may be incorporated in the apparatus to apply forces against certain components. For example, springs can be placed around one or more of the pegs 46 to apply a force against the top of the plank 42 that will hold the plank 42 in the downward-most position within the rail 10 when the additional elevation is not needed. Anti-skid material can be added to components of the apparatus, such as atop the pegs 46. Two or more smaller hinges can be substituted for any of the long hinges 52, 58 and 64, so long as sufficient structural integrity is maintained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for elevating a workpiece above a work surface comprising:

a horizontal rail having an upper plane;

at least one support member within the rail, said at least one support member being moveable from a position below the upper plane of the horizontal rail to a position above the upper plane of the horizontal to support the workpiece above the upper plane of the horizontal rail; and a ramping apparatus below said at least one support member for moving said at least one support member from the position below the upper plane of the horizontal rail to the position above the upper plane of the horizontal rail, said ramping apparatus having a handle thereon for actuating a lateral movement of said ramping apparatus.

2. The apparatus of claim 1 further comprising a plurality of linearly aligned support members.

3. The apparatus of claim 1 wherein said ramping apparatus further comprises a skid assembly positioned under the at least one support member wherein movement of said skid assembly by said handle in a first direction moves the at least one support member above the upper plane of the rail and movement of said skid assembly in a second direction by said handle moves said at least one support member below the upper plane of the rail.

4. The apparatus of claim 3 wherein said skid assembly further comprises at least one ramp element thereon to effect movement of the at least one support member in response to movement of the skid assembly in the first or second direction.

5. An apparatus for elevating a workpiece above the top of a sawhorse comprising:
   a horizontal rail for use on the sawhorse, said rail having a top wall, opposed horizontally extending side walls and opposed end walls, said recited walls defining a chamber;
   a plurality of interconnected, upwardly projecting support member within the horizontal rail;
   a skid positioned below said interconnected, upwardly projecting support members, said skid having a handle and ramp elements on an upper surface, said ramp elements disposed to urge said plurality of interconnected, upwardly projecting support members to a position above the top wall of the horizontal rail upon lateral movement of said skid by said handle to a first position within the chamber to support the workpiece above the sawhorse.

6. The apparatus in claim 5 wherein said ramps on said skid are disposed to permit said plurality of interconnected, upwardly extending support members from the position above the top wall of the horizontal rail to a position below the top wall of the horizontal rail upon movement of the skid by said handle to a second position.

7. The apparatus in claim 6, further comprising a resistance member, the resistance member oriented to directly resist the movement of the skid.

8. The apparatus in claim 6, further comprising a locking mechanism, the locking mechanism being capable of engagement to prevent movement of the skid.

9. The apparatus in claim 5, wherein the top wall of the horizontal rail has a plurality of linearly aligned openings formed therein.

10. An apparatus for elevating a workpiece above the top of a sawhorse comprising:
    a horizontal rail for use on the sawhorse, said rail having a top wall, opposed horizontally extending side walls and opposed end walls, said recited walls defining a chamber;
    a plurality of interconnected, upwardly projecting support members within the horizontal rail;
    a skid, having a handle thereon, positioned below said interconnected, upwardly projecting support members, said skid having a series of linearly aligned upwardly orientated ramp elements on an upper surface positioned to urge said plurality of interconnected, upwardly projecting support members to, and support in, a position above the top wall of the horizontal rail to support the workpiece above the sawhorse upon movement on said skid by said handle to a first position within the chamber.

11. The apparatus in claim 10 further comprising a vertically movable but laterally constrained plank atop the skid, the plank supporting the plurality of interconnected, upwardly extending support elements.

12. The apparatus of claim 11 wherein said plank has a plurality of slots formed therein in, said one each of said slots oriented to accommodate one each of the ramps.

13. The apparatus in claim 12 further comprising a track positioned below the skid and formed to receive the skid, wherein the skid is free to move horizontally along the length of the track but is constrained from any other horizontal movement.

14. The apparatus in claim 10, further comprising a platform formed on the top of the ramps, wherein the plank may rest atop the ramps.

15. A sawhorse capable of elevating a workpiece above the top of the sawhorse comprising:
    a horizontal rail at the top of the sawhorse, said rail having an top wall with a plurality of openings formed therein, as opposed side walls and opposed end walls, said recited walls defining a body with a chamber formed therein;
    a horizontally move skid within the chamber, said skid comprising a series of upwardly oriented ramps on an upper surface of the skid, each ramp having a platform formed on top such that the plank may rest levelly atop the ramps;
    a vertically movable but laterally constrained plank atop the skid having a plurality of slots formed therein, wherein one each of slot of said plurality of slots is oriented to correspond with one each of said series of ramps;
    a plurality of support members positioned atop the plank such that one each of said plurality of support members is aligned with one each of said plurality of openings formed along the top wall of the rail,
    a track positioned below the skid and formed to receive the skid such that the skid is free to move horizontally along the length of the track but constrained from any other horizontal movement;
    a handle attached to the skid through a slot formed in one of the said long sides of the body; and
    wherein lateral movement of the skid to a the first position causes one edge of each of the slots to translate along a ramp corresponding to that edge, thereby simultaneously moving the plank and the plurality of support member in vertical direction whereby the plurality of support members protrude the plurality of openings in the top wall forming a workpiece support surface above the top wall of the rail.

16. The sawhorse of claim 15 further comprising a leg assembly at each end of the horizontal rail wherein each leg of said pair of depending legs is rotatably attached along its top portion to opposing long sides of the rail.

17. The sawhorse of claim 16, further comprising a horizontal shelf rotatably connected at each end to one of said depending legs, said shelf having a hinged center with interlocking tabs that rises when the legs are rotated toward one another, but that locks when in a horizontal position and thereat forms a flat upper surface.

* * * * *

UNITED STATES PATENT AND TRADEMARK OFFICE
CERTIFICATE OF CORRECTION

PATENT NO. : 6,401,865 B1
DATED : June 11, 2002
INVENTOR(S) : Gary K. Elwick

It is certified that error appears in the above-identified patent and that said Letters Patent is hereby corrected as shown below:

Column 8,
Line 24, delete "move skid" insert -- movable skid --

Signed and Sealed this

Twenty-fifth Day of March, 2003

JAMES E. ROGAN
*Director of the United States Patent and Trademark Office*